(12) United States Patent
Ramsey

(10) Patent No.: US 7,568,710 B2
(45) Date of Patent: Aug. 4, 2009

(54) STEERABLE AXLE AUTOMATIC LIFT SENSOR SYSTEM

(75) Inventor: John Edward Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 442 days.

(21) Appl. No.: 11/008,040

(22) Filed: Dec. 9, 2004

(65) Prior Publication Data

US 2005/0127628 A1 Jun. 16, 2005

Related U.S. Application Data

(60) Provisional application No. 60/528,841, filed on Dec. 10, 2003.

(51) Int. Cl.
*B62D 61/12* (2006.01)
(52) U.S. Cl. ..................................... 280/86.5
(58) Field of Classification Search ............. 280/5.501, 280/5.514, 6.157, 86.5, 149.1, DIG. 14; 180/209
See application file for complete search history.

(56) References Cited

U.S. PATENT DOCUMENTS

| | | | |
|---|---|---|---|
| 4,854,409 A * | 8/1989 | Hillebrand et al. ....... | 180/24.02 |
| 5,052,713 A | 10/1991 | Corey et al. | |
| 6,240,339 B1 | 5/2001 | von Mayenburg et al. | |
| 6,572,124 B2 * | 6/2003 | Mlsna et al. ............... | 280/86.5 |
| 6,715,778 B2 | 4/2004 | Gottschalk et al. | |
| 6,830,250 B2 * | 12/2004 | Cervantez et al. ........ | 280/5.501 |

FOREIGN PATENT DOCUMENTS

| | | |
|---|---|---|
| DE | 10219281 A1 | 11/2003 |
| DE | 10219281 A1 | 11/2003 |
| EP | 1398253 A2 | 3/2004 |
| EP | 1398253 B1 | 3/2004 |

\* cited by examiner

*Primary Examiner*—Paul N. Dickson
*Assistant Examiner*—Robert A. Coker
(74) *Attorney, Agent, or Firm*—Krugliak, Wilkins, Griffiths & Dougherty Co., L.P.A.; David P. Dureska; Edward T. Kennedy

(57) ABSTRACT

A sensor system for actuating the lifting of a steerable axle of a wheeled vehicle includes at least one proximity switch mounted on a first structure of the wheeled vehicle and at least one magnet mounted on a second structure of the wheeled vehicle, wherein at least one of the first and second structures pivots relative to the other structure. When at least one of the first and second structures moves to a predetermined position relative to the other structure, the at least one proximity switch and the at least one magnet are aligned in close proximity, thereby activating the proximity switch to, in turn, actuate a lift mechanism for the steerable axle.

14 Claims, 8 Drawing Sheets

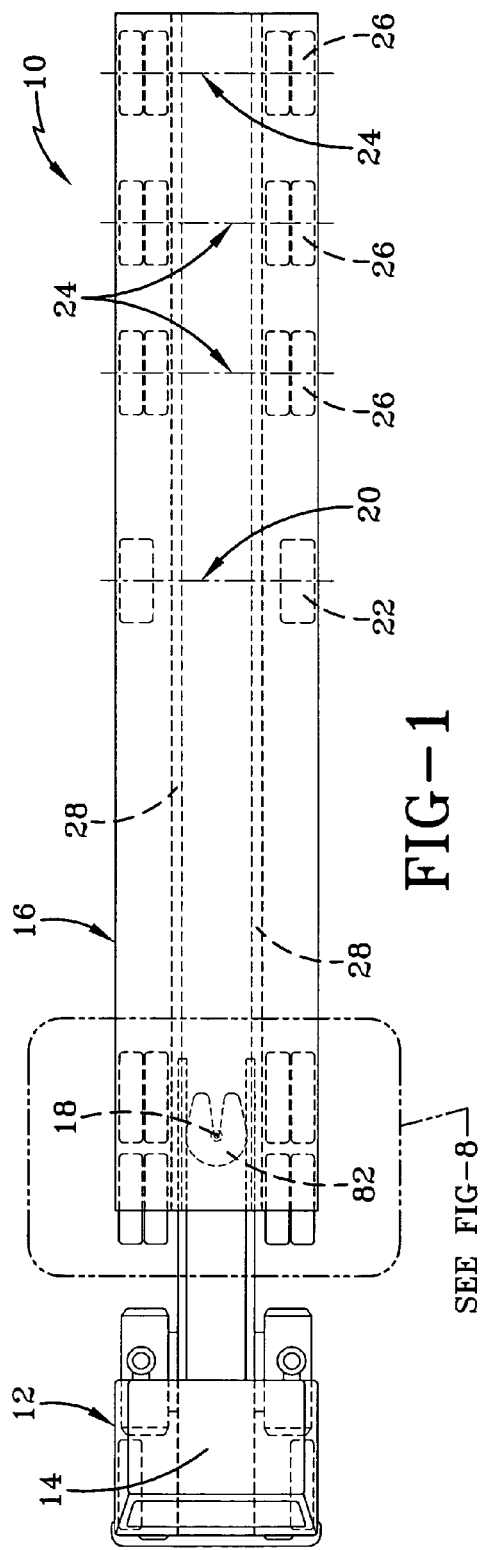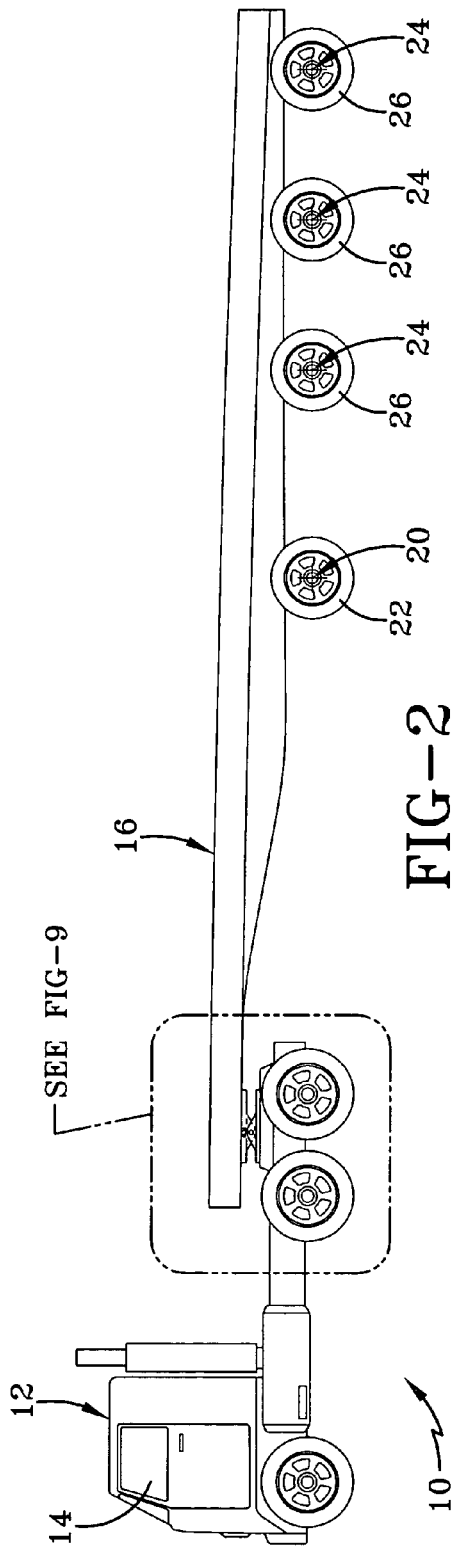

STEERABLE AXLE AUTOMATIC LIFT SENSOR SYSTEM

CROSS-REFERENCE TO RELATED APPLICATION

This application claims the benefit of U.S. Provisional Application Ser. No. 60/528,841, filed on Dec. 10, 2003.

BACKGROUND OF THE INVENTION

1. Field of the Invention

The present invention relates to the art of axle/suspension systems for vehicles. More particularly, the invention relates to the art of sensor systems for steerable and liftable axle/suspension systems of heavy-duty vehicles, such as tractor-trailers or semi-trailers, and straight trucks. Still more particularly, the invention relates to a sensor system that triggers lifting of a certain one of the axle/suspension systems and associated wheels of a heavy-duty vehicle during predetermined maneuvering situations.

2. Background Art

Heavy-duty vehicles such as tractor-trailers and straight trucks typically include multiple axles that are longitudinally spaced along the vehicle to create ride stability. At times, it is necessary to lift at least one of the axles, including the suspension assemblies and wheels and tires that are associated with the axle. For example, it may be necessary to lift an axle when the vehicle is performing an extremely tight turning maneuver, which frequently occurs on private property at a loading facility. The axle that is lifted is commonly referred to as the lift axle, and typically is a forward axle or a rearward axle of a plurality of longitudinally-spaced axles that are suspended from the vehicle. For the purpose of convenience, reference herein will be made to a lift axle that is a forward axle. The non-liftable axles in the group that are rearward of the lift axle are known in the art as primary axles.

The actual lifting of the lift axle is performed by the transversely-spaced suspension assemblies that are associated with the lift axle, with such lift axle/suspension systems being well-known in the art. The lift axle/suspension system typically is operated by a control system that is in turn actuated by a switch, commonly referred to as a lift switch, which is manually triggered by the operator of the vehicle. Lift switches traditionally have been installed in the cab of the vehicle for proximity to the operator. This prevents an operator from having to exit the cab, which can be particularly inconvenient in circumstances such as inclement weather.

Recently, laws have been enacted in Canada which direct that axles that had previously been lifted for maneuverability must now instead be steerable axles. That is, the axle may not be lifted for maneuverability when moving in a forward direction, but must instead remain on the ground and steer to attain maneuverability. Such steerable axles are well-known in the art, and it is also well-known in the art that steerable axles are capable of being lifted. Hence, for the purpose of simplicity, reference herein will be made to steerable axles with the understanding that steerable axles include lift axles.

The new laws still allow a steerable axle to be lifted when the vehicle is moving in reverse, since certain widely-used systems do not operate to steer the steerable axle when the vehicle is moving in a reverse direction. To ensure that the steerable axle is not lifted while vehicle is moving over-the-road in a forward direction or making a forward turn maneuver, however, the recently enacted laws do not allow a lift switch in the tractor cab.

These new laws have generated a great deal of concern for tractor-trailer operators, since problems can occur when a vehicle having a steerable axle attempts an extremely sharp turn, which often happens when the vehicle is being maneuvered to align with a loading dock. Space limitations imposed by the arrangement of the suspension beams and trailer frame rails typically do not allow the wheels that are mounted on a steerable axle to be turned more than about twenty to thirty degrees from the longitudinally-extending centerline of the vehicle. It is to be noted that the angle of the wheels that is required to make a turn, relative to this longitudinally-extending centerline, is known as the wheel-cut angle. Thus, in typical heavy-duty vehicle arrangements, when the wheel-cut angle is greater than about twenty to thirty degrees, the wheels on the steerable axle cannot turn to the degree that is required, remaining at an angle of only about twenty to thirty degrees.

The resulting adverse condition caused by the inability of the wheels of the steerable axle to execute a wheel-cut angle of more than twenty to thirty degrees is tire scrub, also known as drag. In some tight turning maneuvers, the angle between the tractor and the trailer often approaches ninety degrees. In such a maneuver, when the wheels and tires of the steerable axle are not lifted, they are effectively prevented from rolling since they can turn to an angle of only about twenty to thirty degrees, and are thus dragged in the direction of the turn. This undesirable situation causes scrubbing, or excessive wear of the tires, and results in the need to more frequently replace the tires of the steerable axle, thereby creating increased vehicle operation costs.

In addition, the steerable axle typically is located at about the center of the trailer in the fore-aft direction and usually uses a single tire on each of the wheels at the axle ends. Such single tires each have a large area of contact with the ground. In a tight turning maneuver, the central positioning of the steerable axle combines with the large area of contact of the tires and the severe angle between the tractor and the trailer, thereby causing the wheels of the steerable axle to act as a pivot point. The tires on the wheels of the primary axles are roughly at right angles to the directional forces acting on the trailer, forcing these tires sideways and scrubbing them. The scrubbing of the tires on the primary axles further increases the problems of more frequent tire replacement and decreased vehicle maneuverability.

One solution to the scrubbing problem would be to increase the wheel-cut angle for the wheels of the steerable lift axle. However, as mentioned above, the arrangement of the suspension beams and trailer frame rails imposes space limitations that, in turn, limits the wheel-cut angle to about twenty to thirty degrees. Thus, a solution involving an increased wheel-cut angle would necessarily involve relocation of the suspension beams and frame rails. Due to the performance requirements that are associated with a heavy-duty vehicle, however, such as roll stability and load capacity, structural requirements are imposed that do not allow the frame rails and suspension beams to be substantially relocated. As a result, structural changes cannot readily be accomplished that would allow the wheel-cut angle to significantly exceed about twenty to thirty degrees, let alone a greater angle approaching about ninety degrees, as is desired for tight turning maneuvers.

In an attempt to reduce these scrubbing problems, the new laws that mandate the use of a steerable axle permit the lifting of the steerable axle when a manual lift switch is located on the trailer near the steerable axle, rather than inside the tractor cab. This would allow a driver to execute a drag-turn maneuver of the type usually performed at a loading facility, which typically is located on private property, without scrubbing tires. To use such a switch, however, the driver must exit the cab, engage the switch to lift the steerable axle, re-enter the cab, complete the tight maneuver, exit the cab again, re-engage the switch to lower the axle, re-enter the cab, and finally continue on his way. Because weather conditions often may be harsh, particularly during winter in countries such as Canada, the exercise of the driver repeatedly exiting the cab to engage a manual switch to lift and lower the steerable lift axle is very inconvenient and potentially dangerous.

Thus, a need exists in the art for an apparatus that overcomes the problems of the prior art by allowing a steerable axle to be lifted during tight maneuvering of a vehicle without the need for a driver to exit the cab of the vehicle, yet without the use of a manual lift switch located in the tractor cab. The present invention provides such an apparatus, which automatically causes a steerable axle to be lifted in tight turning maneuvers.

BRIEF SUMMARY OF THE INVENTION

An objective of the present invention is to provide an apparatus that automatically causes a steerable axle to be lifted in a tight turning maneuver.

Another objective of the present invention is to provide an apparatus that automatically causes a steerable axle to remain lifted throughout a tight turning maneuver.

Yet another objective of the present invention is to provide an apparatus that allows a steerable axle that has been lifted in a tight turning maneuver to be automatically lowered after the tight turning maneuver has been completed.

These objectives and others are obtained by the steerable axle lift sensor system of the present invention, the general nature of which may be stated as a sensor system for actuating the lifting of a steerable axle of a wheeled vehicle, in which the wheeled vehicle includes first and second structures, and at least one of the first and second structures is moveable relative to the other one of the first and second structures. The sensor system includes sensing means mounted on a selected one of the first and second structures. When at least one of the first and second structures moves to a predetermined position relative to the other one of the first and second structures, the sensing means senses the position and actuates a lift mechanism for the steerable axle.

The general nature of the steerable axle lift sensor system of the present invention may also be stated as including a sensor system for actuating the lifting of a steerable axle of a wheeled vehicle, in which the steerable axle has a central member and a spindle arm pivotally mounted on each one of a pair of ends of the central member. The sensor system includes a selected one of a sensing means and an activation means mounted on the axle central member and the other one of the sensing means and the activation means mounted on the spindle arm. When the spindle arm pivots to a predetermined position, the sensing means is activated by the actuation means, and in turn actuates a lift mechanism for the steerable axle.

The general nature of the steerable axle lift sensor system of the present invention may also be stated as including a sensor system for actuating the lifting of a steerable axle of a wheeled vehicle, in which the wheeled vehicle Includes a trailer and a tractor having a fifth wheel, with the trailer being pivotally connected to the tractor fifth wheel. The sensor system includes a selected one of a sensing means and an activation means mounted on the trailer and the other one of the sensing means and the activation means mounted on the tractor fifth wheel. When the trailer and the tractor fifth wheel pivot relative to one another to a predetermined position, the sensing means is activated by the actuation means, and in turn actuates a lift mechanism for the steerable axle.

BRIEF DESCRIPTION OF THE SEVERAL VIEWS OF THE DRAWINGS

The preferred embodiments of the invention, illustrative of the best modes in which applicant has contemplated applying the principles of the invention, are set forth in the following description and are shown in the drawings, and are particularly and distinctly pointed out and set forth in the appended claims.

FIG. 1 is a schematic plan view, with hidden structure represented by broken lines, of a cab and trailer of a tractor-trailer vehicle incorporating an embodiment of the sensor system of the present invention;

FIG. 2 is a schematic side elevational view of the tractor-trailer vehicle shown in FIG. 1;

Similar numerals refer to similar parts throughout the drawings.

DETAILED DESCRIPTION OF THE INVENTION

Figure 3:
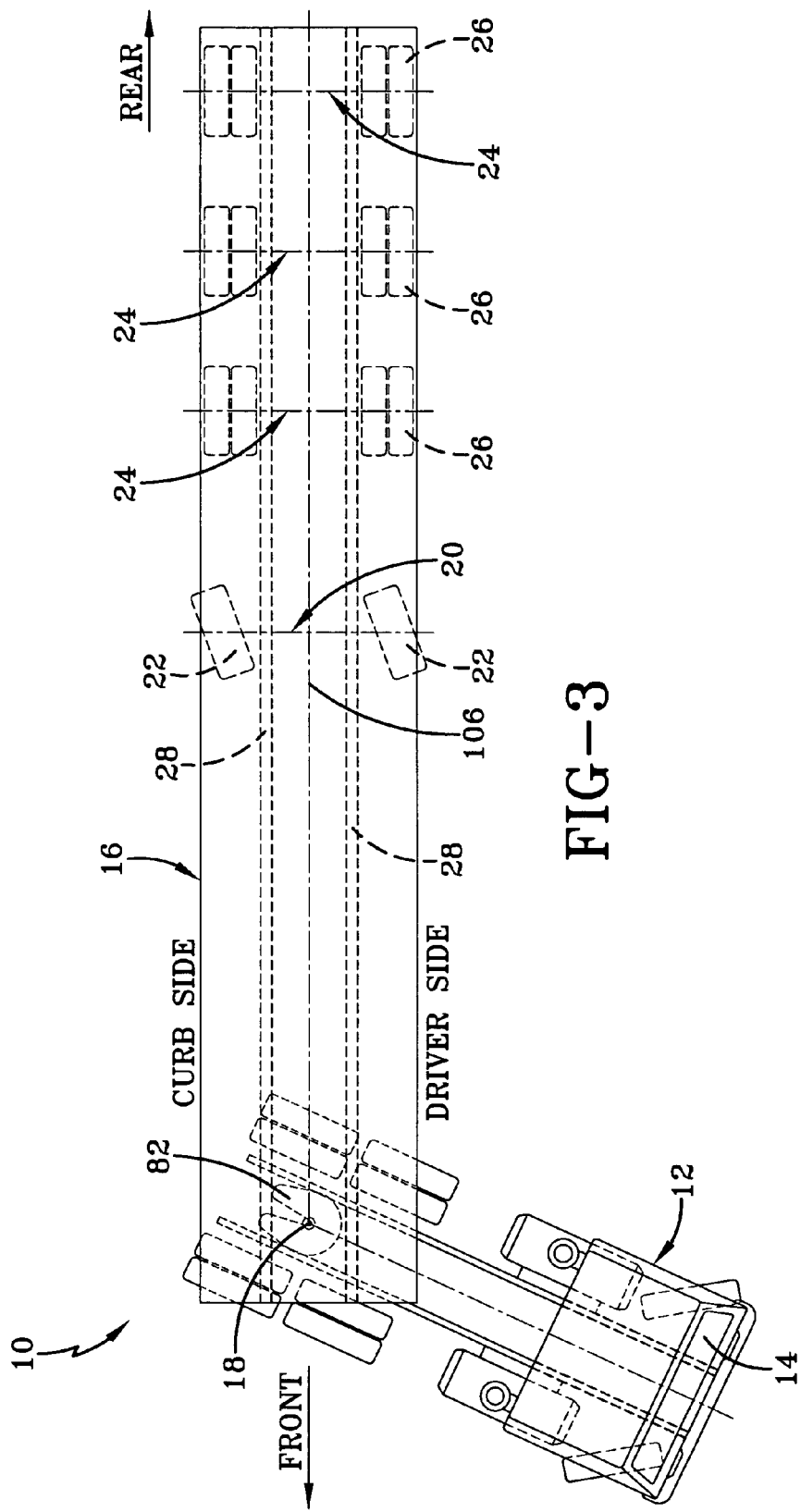
FIG. 3 is a view similar to FIG. 1, but showing the vehicle making a tight left-hand turn.

Turning now to the drawings, wherein the illustrations are provided to show preferred embodiments of the invention and not to limit the same, a heavy-duty vehicle is shown in FIGS. 1-2 and indicated generally at 10. Vehicle 10 includes a tractor 12 with a cab 14, and a trailer 16 pivotally connected to the cab via a kingpin 18 as known in the art. A typical steerable axle 20 is the forward axle in a group of longitudinally-spaced trailer axles, and a wheel assembly 22 is mounted on each end of the steerable axle. Rearward of steerable axle 20 are non-steerable primary axles 24, on which respective wheel assemblies 26 are mounted.

As shown in FIG. 3, when vehicle 10 makes a turn, wheels 22 on steerable axle 20 also turn, but are limited by trailer frame rails 28 from turning to a wheel-cut angle that is greater than about twenty to thirty degrees. When a sharp turn is made, however, a wheel-cut angle well over twenty to thirty degrees is required, but since such a large wheel-cut angle is not practically feasible, as described above, the tires on wheels 22 of steerable axle 20 are dragged and scrubbed if the steerable axle is not lifted. In addition, as described above, if steerable axle 20 is not lifted, the tires on wheels 22 act as a pivot point during the turning maneuver, forcing the tires on wheels 26 of primary axles 24 sideways, scrubbing them as well. Hence, there is a need to provide for automatic lifting of steerable axle 20 during tight turning maneuvers.

The present invention sensor system automatically signals a control system to actuate or cause steerable axle 20 to lift when vehicle 10 makes a turn that results in a wheel-cut angle of the steerable ends of the axle, and the wheels/tires mounted thereon, which is equal to or greater than about twenty to thirty degrees. Once vehicle 10 has moved forward after completing the turning maneuver, the sensor system then signals the control system to actuate lowering of the steerable axle and associated suspension components. It is to be noted that, while reference herein is made to a tractor-trailer, such reference is for the purpose of illustration only, as vehicle 10 includes tractor-trailers and straight trucks, particularly for the first embodiment of the invention, described immediately below.

Figure 4:
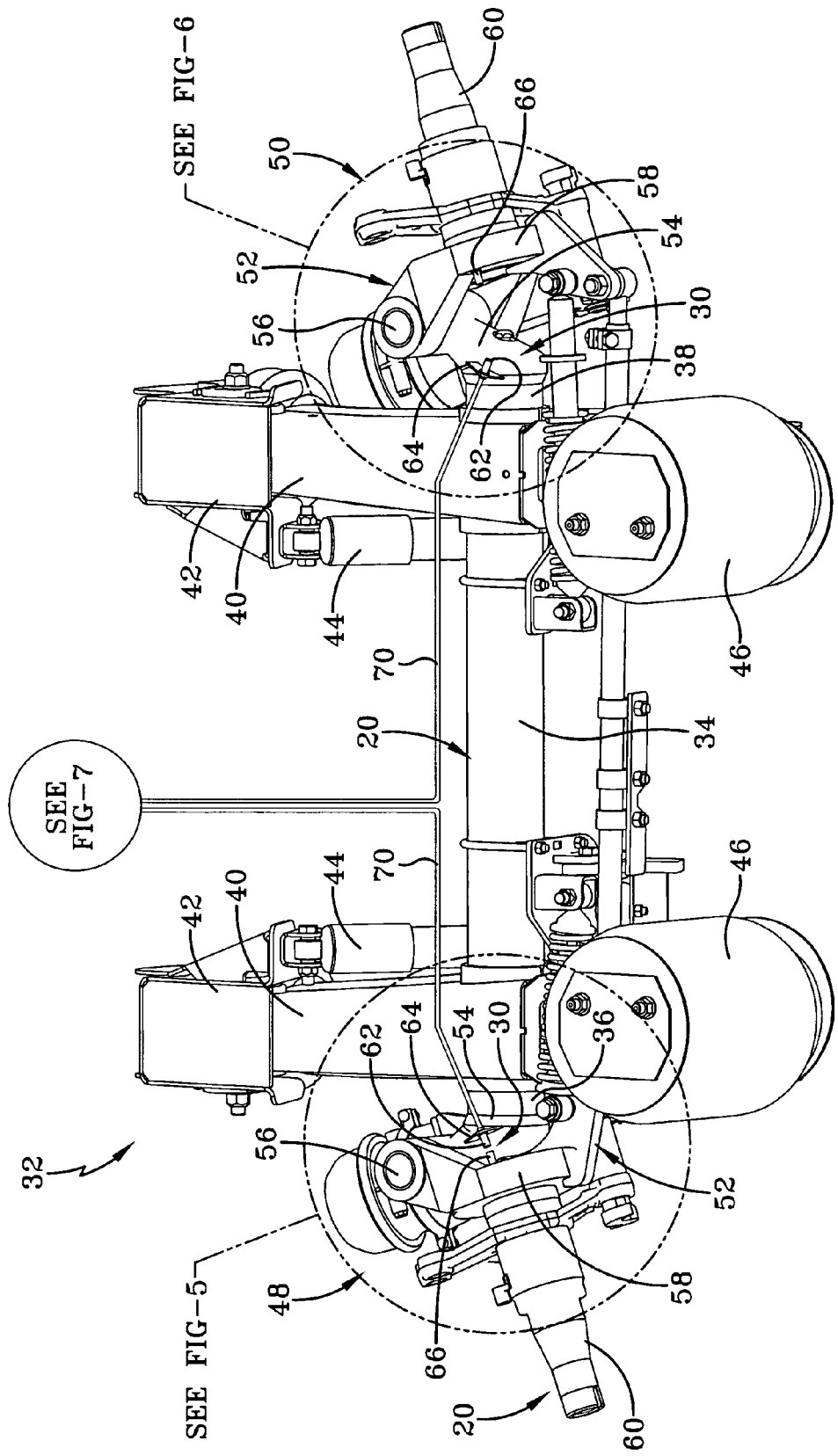
FIG. 4 is a top rear perspective view of an axle/suspension system utilizing a first embodiment of the sensor system of the present invention.

Turning now to FIG. 4, a first embodiment sensor system of the present invention is indicated generally at 30. First embodiment sensor system 30 is used in conjunction with a steerable lift axle/suspension system 32, and so that the environment in which the present invention operates can be best understood, a typical heavy duty vehicle axle/suspension system now will be described.

Steerable lift axle 20 is part of axle/suspension system 32 and includes a transversely-extending central axle tube 34 that has a driver's end 36 and a curb end 38. Central axle tube 34 is supported by a pair of transversely-spaced trailing arm beams 40, which typically are welded or otherwise rigidly affixed to the central axle tube. Each trailing arm beam 40 is pivotally attached in a well-known fashion at its front end to a respective one of a pair of transversely-spaced frame hangers or brackets 42, which in turn are rigidly attached to and depend from the primary vehicle frame (not shown). Axle/suspension system 32 preferably also includes a pair of shock absorbers 44 and a pair of air springs 46. Each shock absorber 44 extends between and is mounted on a respective one of beams 40 and a corresponding hanger 42. Each air spring 46 extends between and is mounted on a rear end of a respective one of beams 40 and a corresponding trailer frame member. It is to be noted that the present invention finds application on axle/suspension system 32, as shown, and on other axle/suspension systems known in the art, such as on axle/suspension systems used with sliders and on axle/suspension systems of the leading arm or beam type.

To allow the wheels attached to steerable lift axle 20 to turn, the axle also includes a pair of axle ends 48 and 50, as known in the art. Driver's side axle end 48 (FIG. 5) is pivotally connected to driver's end 36 of central axle tube 34, and curb side axle end 50 (FIG. 6) is pivotally connected to curb end 38 of the central axle tube. More specifically, each one of driver's side and curb side axle ends 48, 50 includes a pivot assembly 52, which in turn includes a stationary portion, such as a fixed arm 54. Pivotally connected outboardly from fixed arm 54 at a main hinge point 56 is a turning wheel end or pivot bracket 58. Extending outboardly from pivot bracket 58 of each axle end 48, 50 is a spindle end 60, on which a wheel (not shown) is mounted.

When the wheels mounted on steerable lift axle 20 turn, pivot bracket 58 is caused by pivot assembly 52 to move in relation to fixed arm 54 at main hinge point 56. For example, when the wheels of steerable lift axle 20 turn toward the driver's side of vehicle 10 to make a forward left turn, pivot bracket 58 of driver's side axle end 48 pivots toward fixed arm 54 about main hinge point 56, while the pivot bracket of curb side axle end 50 pivots away from its corresponding fixed arm about the main hinge point, as shown in FIG. 4.

Figure 5:
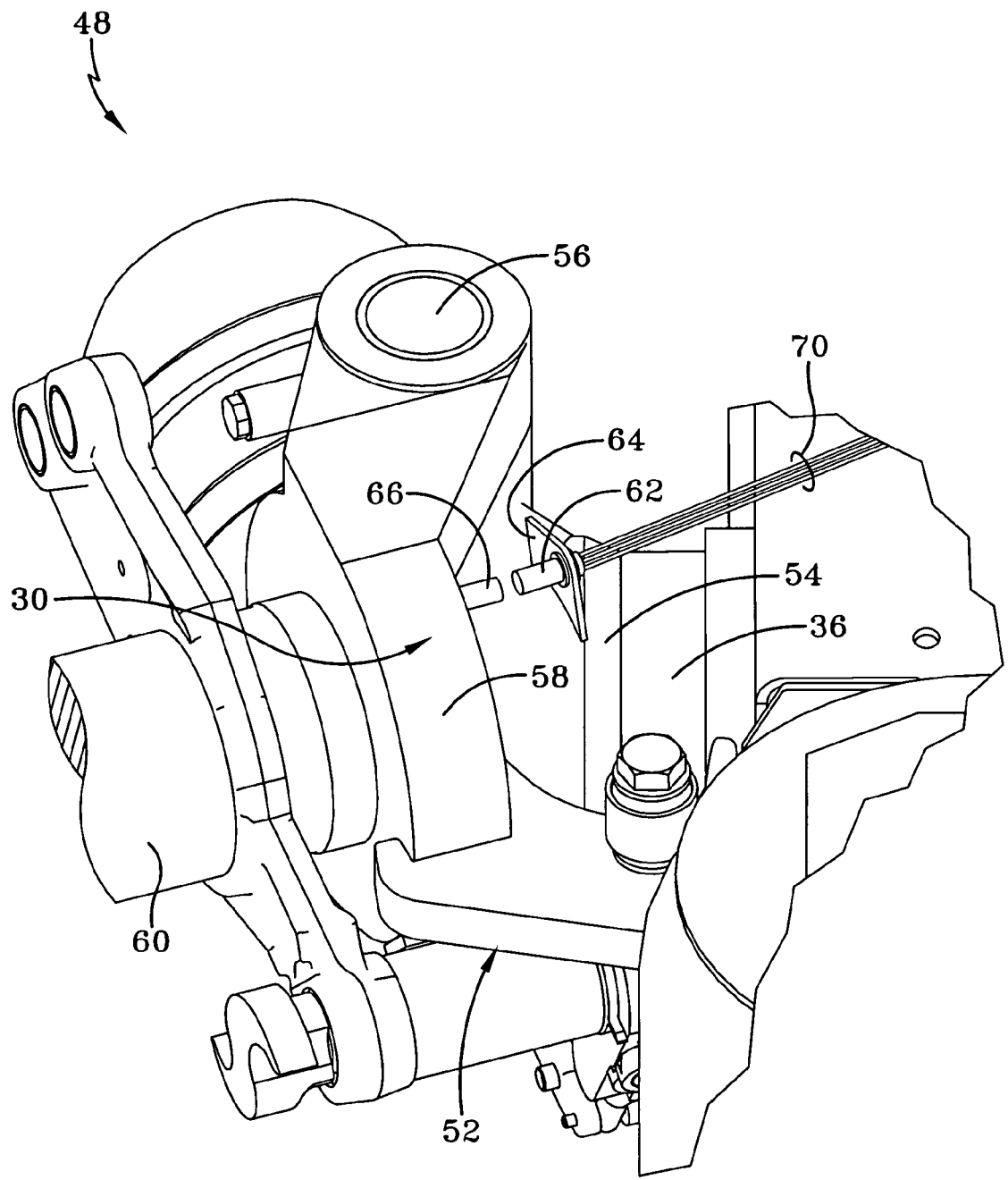
FIG. 5 is an enlarged fragmentary top rear perspective view of the portion of the axle/suspension system and the first embodiment of the sensor system shown in the circled portion of FIG. 4 and marked "SEE FIG. 5"
Figure 6:
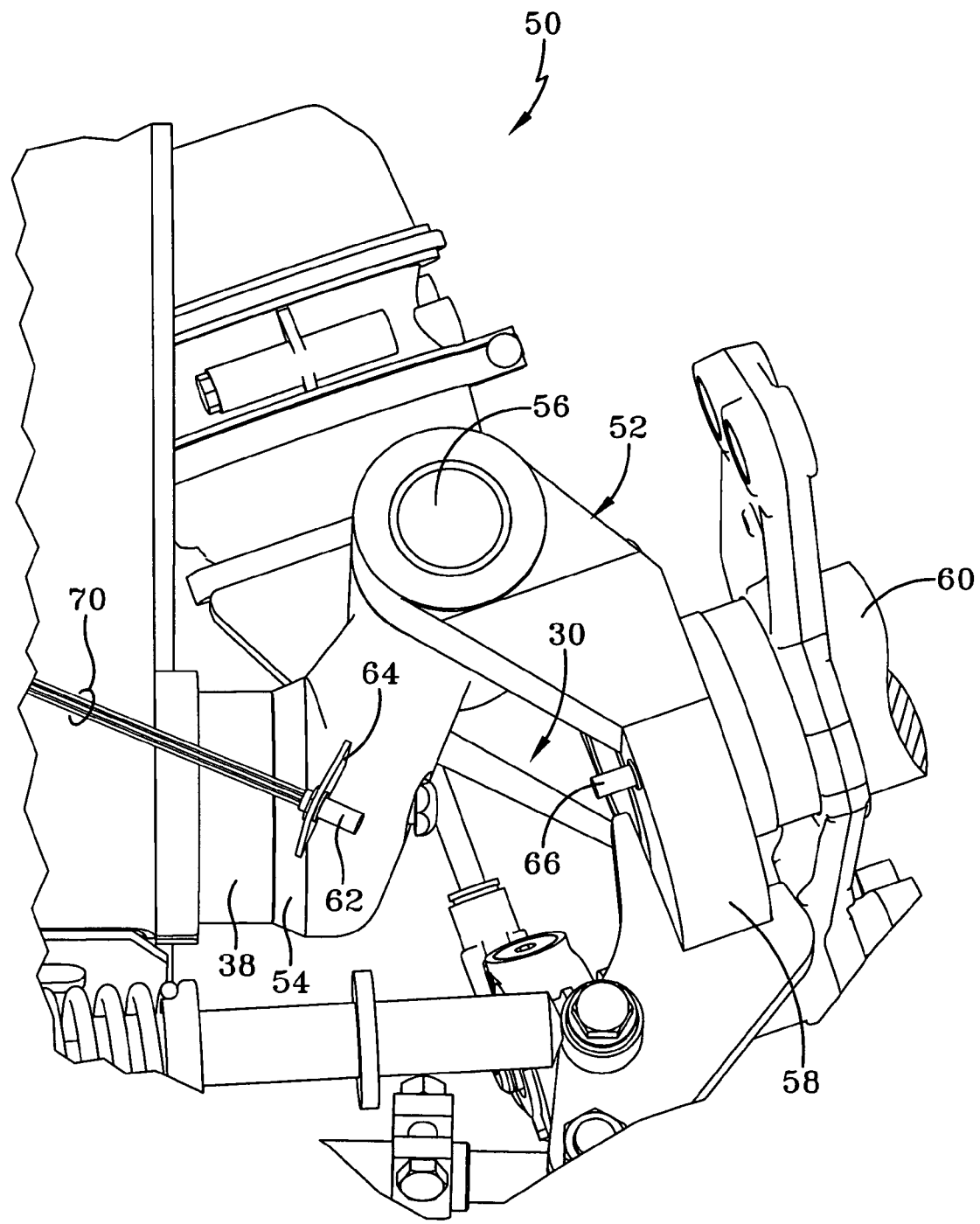
FIG. 6 is an enlarged fragmentary top rear perspective view of the portion of the axle/suspension system and the first embodiment of the sensor system shown in the circled portion of FIG. 4 and marked "SEE FIG. 6"

In accordance with a key feature of the present invention, and with additional reference to FIGS. 5 and 6, first embodiment sensor system 30 is mounted on pivot assembly 52 of each one of driver's side and curb side axle ends 48, 50, respectively. First embodiment sensor system 30 includes sensing means 62, such as a proximity switch, which is mounted on a mounting bracket 64, and which in turn is mounted on fixed arm 54 at or near a location on the arm that preferably is distal from main hinge point 56. Activation means 66, such as a magnet, is mounted on pivot bracket 58 at a location that provides alignment of the magnet with proximity switch 62 when the pivot bracket reaches its limit of inboard pivotal movement toward fixed arm 54. At that limit of pivotal movement, magnet 66 generally is aligned with and adjacent to proximity switch 62 and activates the switch (FIG. 5).

It is important to note that the limit of inboard pivotal movement of pivot bracket 58 toward fixed arm 54, which determines the exact mounting position of proximity switch 62 on the fixed arm and the exact mounting position of magnet 64 on the pivot bracket, corresponds to the limit of the wheel-cut angle for steerable lift axle 20. More particularly, the wheel-cut angle for steerable axle 20 typically is about twenty to thirty degrees. Thus, proximity switch 62 and magnet 66 each are positioned on fixed arm 54 and pivot bracket 58, respectively, of driver's side axle end 48 so that they are aligned and in close proximity to each other when the wheel-cut angle during a forward left turn is at some maximum angle, such as between about twenty to thirty degrees (FIG. 5). Similarly, proximity switch 62 and magnet 66 are positioned on curb side axle end 50 so that they are aligned and in close proximity to each other when the wheel-cut angle during a forward right turn is at some maximum angle, such as between about twenty to thirty degrees. Of course, a proximity switch 62 can be used that enables adjustment of the distance between magnet 66 and the switch.

It also is important to note that, as indicated above, driver's side and curb side sensor systems 30 are preferably separately activated by different turning maneuvers. That is, when vehicle 10 makes a forward turning maneuver to the left or a rearward turning maneuver to the right, pivot bracket 58 of driver's side axle end 48 pivots toward fixed arm 54 as shown in FIGS. 3-5 and magnet 66 moves into close alignment with proximity switch 62 and activates the driver's side switch. In these maneuvers, pivot bracket 58 of curb side axle end 50 pivots away from fixed arm 54 as shown in FIGS. 3-6 and magnet 66 moves away from proximity switch 62 to disable the curb side switch.

Similarly, when vehicle 10 makes a forward turning maneuver to the right or a rearward turning maneuver to the left (not shown), curb side pivot bracket 58 pivots toward fixed arm 54, causing magnet 66 to move into close alignment with and activating curb side proximity switch 62. In this maneuver, pivot bracket 58 of driver's side axle end 48 pivots away from fixed arm 54 and magnet 66 moves away from proximity switch 62 to disable the driver's side switch.

Figure 7:
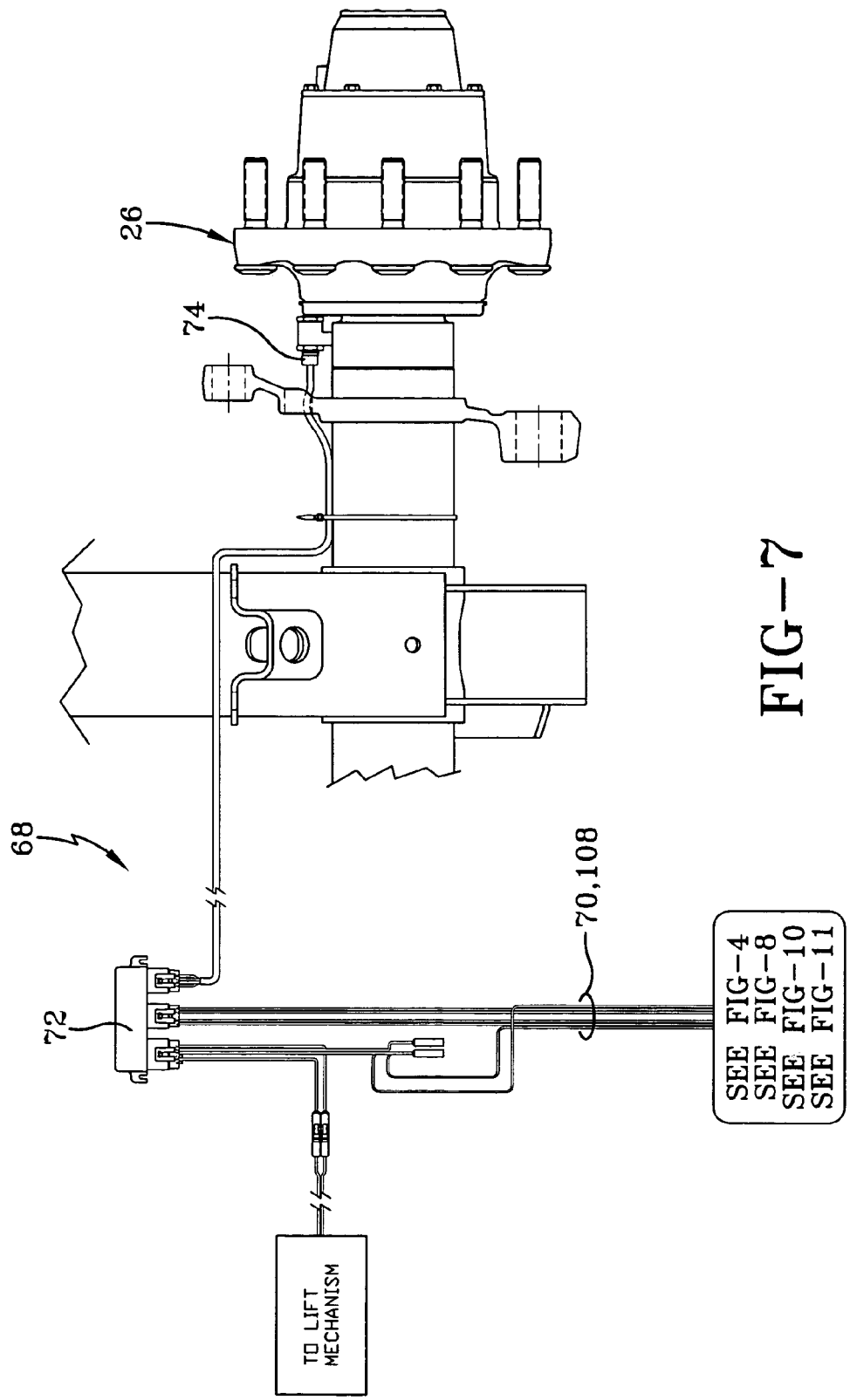
FIG. 7 is a fragmentary schematic representation of a control system utilized in the sensor system of the present invention, shown incorporated into an axle/suspension system.

As shown in FIGS. 4 and 7, driver's side and curb side proximity switches 62 each are independently electrically connected to an automatic lift axle control system 68 via connection means 70. Connection means 70 preferably includes wires, coaxial cables, optical cables, and the like, which are well known in the controller art. Control system 68 actuates the lift mechanism (not shown) for axle/suspension system 32. Such lift mechanisms are known in the heavy-duty vehicle art. Thus, when proximity switch 62 is activated by a turning maneuver that causes the wheel-cut angle of steerable lift axle 20 to equal or exceed approximately twenty to thirty degrees, the proximity switch senses the closely aligned magnet 66 and sends a signal to control system 68 via connection means 70, which in turn actuates the lift mechanism, causing lifting of the steerable axle.

With particular reference to FIG. 7, control system 68 includes a lift axle control processor unit 72 that receives the activation signal from proximity switch 62 (FIG. 4), indicating that vehicle 10 is executing a sharp turn, and processor unit 72 in turn sends a signal to the axle/suspension system lift mechanism (not shown), causing the lift mechanism to actuate. One preferred axle/suspension system lift mechanism control system 68 uses radio frequency to control the lifting of axle/suspension system 32, and is disclosed in U.S. Pat. No. 6,715,778, issued on Apr. 6, 2004, to Gottschalk et al and assigned to the assignee of the present invention, The Boler Company of Itasca, Ill. Of course, other control systems that are known in the art can be used, such as systems that are hard-wired, or mixed hard-wire and radio frequency (wherein a radio frequency is transmitted from cab 14 to a receiver on trailer 16, which in turn is hard-wired to other system components). It is to be understood that selection of a particular control system 68 may be dictated at least in part by compliance with local regulations. For example, radio frequency control system 68, as described above, preferably is used to comply with applicable Canadian laws.

After vehicle 10 completes the sharp turning maneuver, the wheel-cut angle of steerable lift axle 20 returns to an angle that is less than about twenty to thirty degrees. This causes driver's side pivot bracket 58 (FIGS. 4-6) to rotate away from fixed arm 54, thereby removing magnet 66 from close alignment with proximity switch 62. Control system 68 maintains axle/suspension system 32 in a lifted or raised position until a signal is sent to lower steerable axle 20. That is, lifted steerable axle 20 automatically centers the tires mounted thereon by re-aligning wheels 22 approximately parallel to a longitudinal centerline 106 (FIG. 3), as known in the art, and waits for a signal from processor unit 72 that causes the steerable axle to be lowered. Processor unit 72 sends the signal to lower steerable axle 20 when vehicle 10 has moved forward a predetermined distance as measured by a direction sensor 74 disposed proximate wheel 26 mounted on one of primary axles 24 (FIG. 7). When the predetermined distance is reached, sensor 74 sends a signal to control processor unit 72, which activates the lift axle mechanism causing lowering of axle/suspension system 32, in a manner well-known in the art.

It is to be understood that other means of sensing the completion of a drag turn maneuver, such as a certain time delay, may be used in addition to or in place of direction sensor 74, causing axle/suspension system 32 to lower, without affecting the overall concept of the present invention. Moreover, alternative mounting arrangements of proximity switch 62 and magnet 66 to accomplish automatic lifting of axle/suspension system 32 during a drag turn maneuver may be employed without affecting the overall concept of the invention.

In this manner, first embodiment sensor system 30 of the present invention provides an apparatus and method that efficiently and automatically causes steerable axle 20 to be lifted when the wheel-cut angle equals or exceeds about twenty to thirty degrees. As a result, in a tight turning maneuver, the scrubbing of the tires on wheels 22, 26 mounted on steerable lift axle 20 and primary axles 24, respectively, is reduced or prevented without the need for the driver to exit cab 14 to activate a manual switch.

First embodiment sensor system 30 finds particular application in loading dock and parking lot maneuvering situations, as described above. Moreover, first embodiment sensor system 30 finds application for most over-the-road driving conditions, as the turning maneuvers needed to navigate most roads create a wheel-cut angle that is less than about twenty to thirty degrees. As mentioned above, structural limitations of trailer 16 prevent wheels 22 mounted on steerable lift axle 20 from turning to a wheel-cut angle that is substantially greater than about twenty to thirty degrees. If certain over-the-road conditions, however, are anticipated that are likely to result in a wheel-cut angle that is greater than about twenty to thirty degrees, to prevent unwanted lifting of steerable axle 20, a second embodiment sensor system of the present invention, indicated generally at 80, may be used. Second embodiment sensor system 80 preferably will not lift steerable axle 20 until the wheel-cut angle is significantly greater than twenty to thirty degrees, which may allow certain tires to scrub, but limits the extent of such scrubbing by actuating the lifting of the steerable axle at more severe wheel-cut angles. More specifically, depending on the application, second embodiment sensor system 80 can be arranged to lift steerable axle 20 at a predetermined angle of anywhere from about 20 degrees to about 90 degrees.

Figure 8:
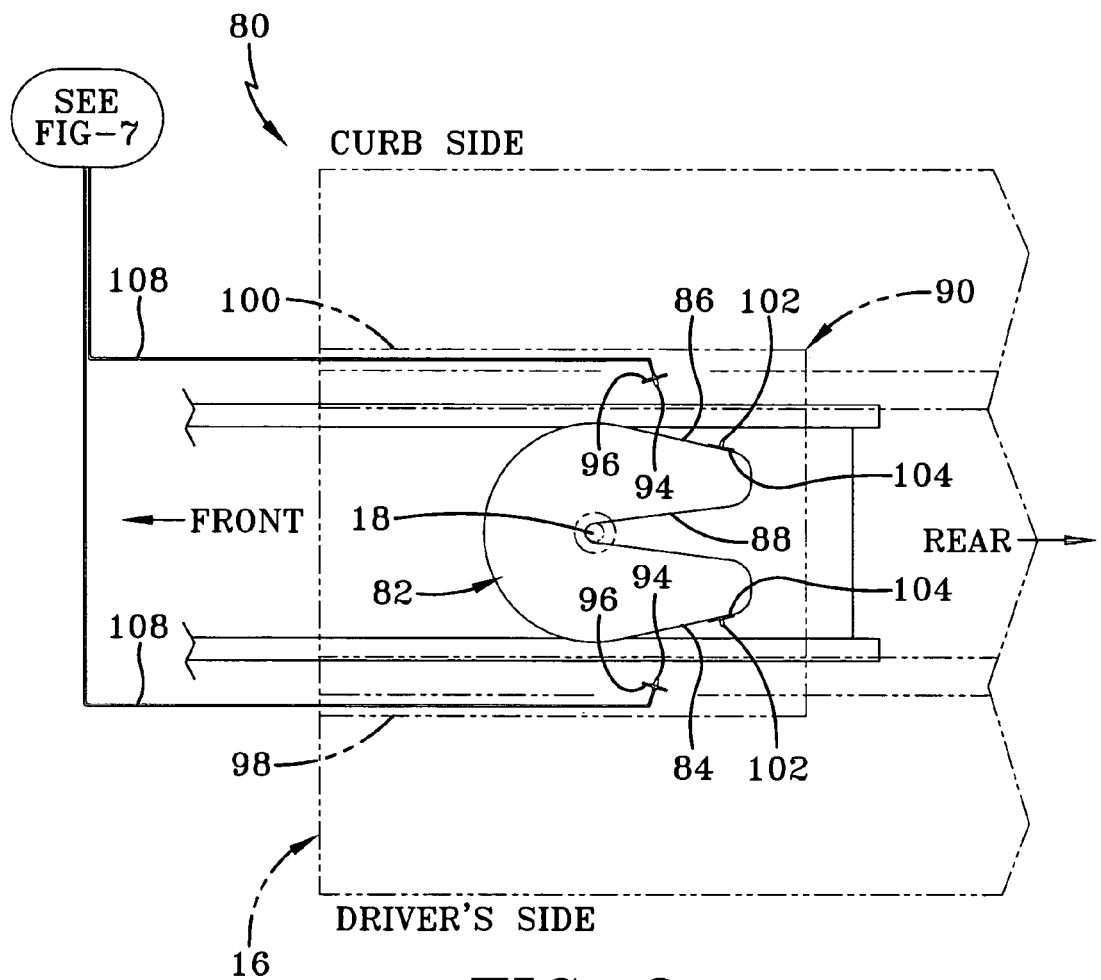
FIG. 8 is an enlarged fragmentary schematic plan view, with hidden structure represented by broken lines, of the second embodiment of the sensor system and the portion of the cab and trailer shown in the boxed portion of FIG. 1 and marked "SEE FIG. 8"
Figure 9:
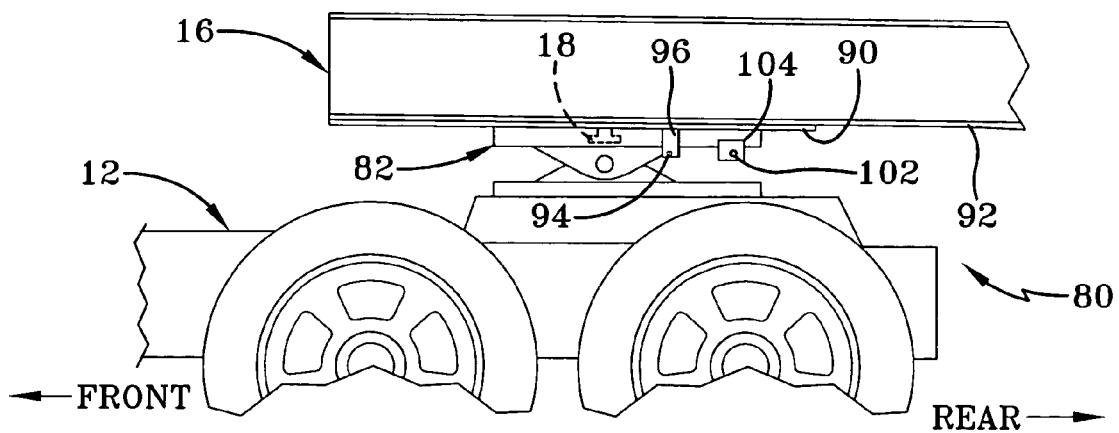
FIG. 9 is an enlarged fragmentary schematic side elevational view of the second embodiment of the sensor system and the portion of the cab and trailer shown in the boxed portion of FIG. 2 and marked "SEE FIG. 9"
Figure 10:
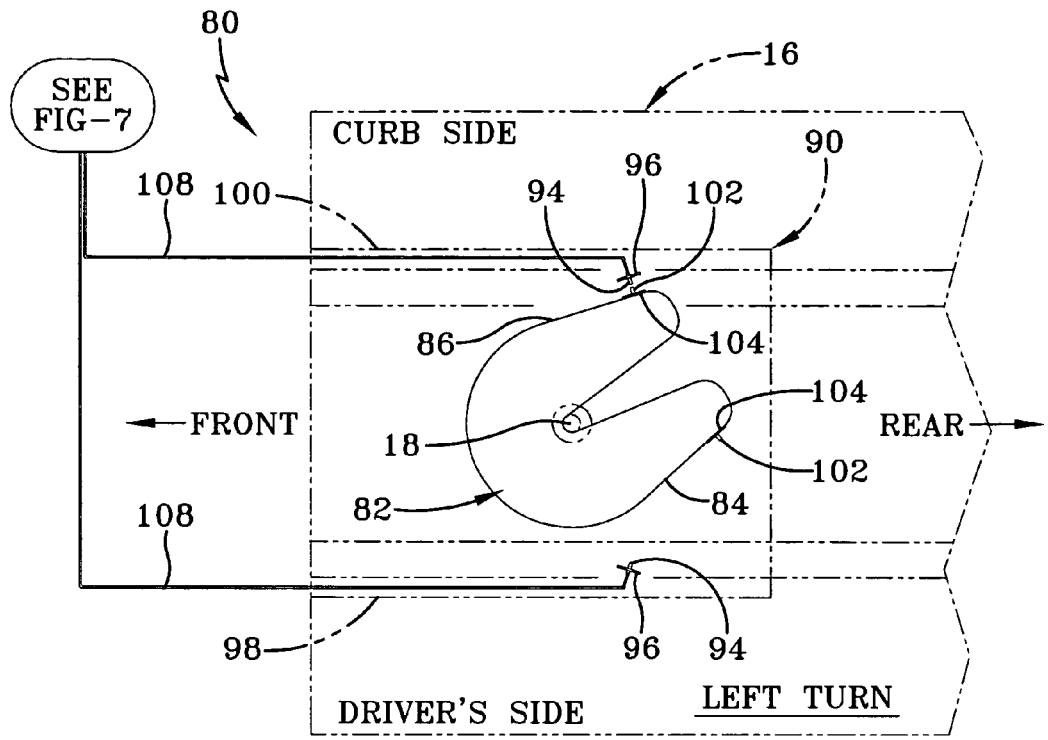
FIG. 10 is a view similar to FIG. 8, but showing the vehicle making a left-hand turn.
Figure 11:
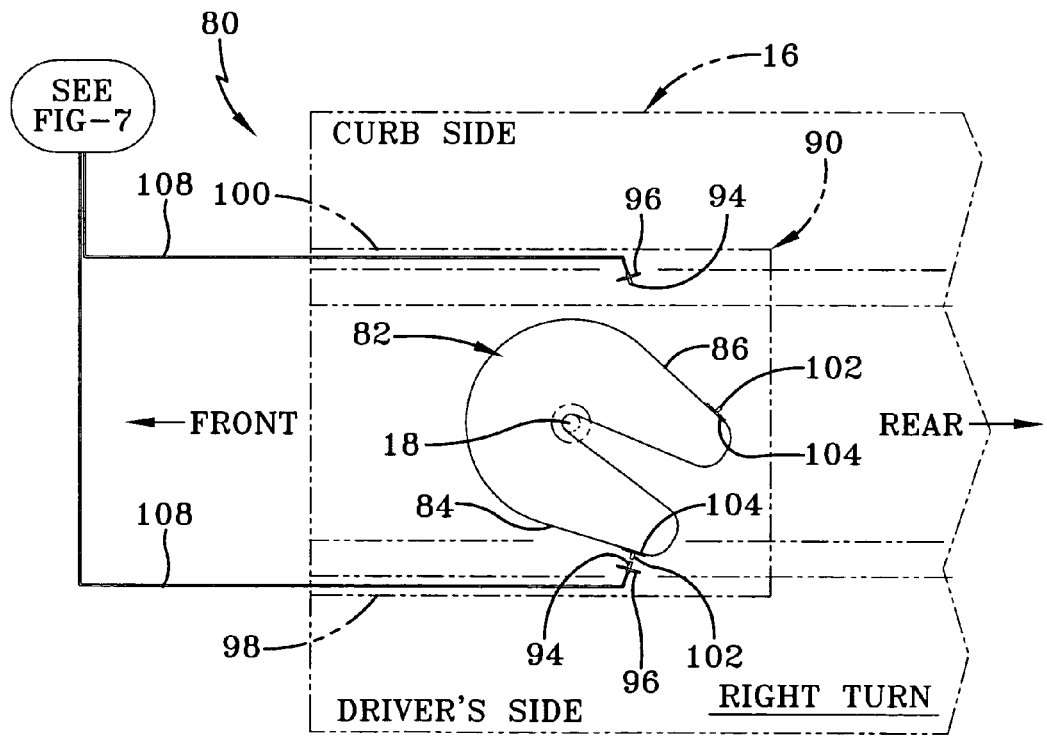
FIG. 11 is a view similar to FIG. 8, but showing the vehicle making a right-hand turn.

Second embodiment sensor system 80 is shown in FIGS. 8-11 and uses movement of a tractor fifth wheel 82, instead of the movement of spindle ends 60 of steerable lift axle 20, to sense the turn angle and lift the steerable axle. More specifically, tractor fifth wheel 82 is immovably mounted on tractor 12, as known in the art, and includes a driver's side 84 and a curb side 86. Fifth wheel 82 pivotally accepts kingpin 18 of trailer 16 in a slot 88 formed in the fifth wheel. As is well-known in the art, kingpin 18 is a structural pin immovably attached to and depending from the frame of trailer 16. Fifth wheel 82 and kingpin 18 function as connectors between tractor 12 and trailer 16, respectively, and enable pivotal movement of the tractor and trailer relative to one another for executing turning maneuvers. As shown in FIGS. 3, 10 and 11, during such maneuvers, the angle between tractor 12 and trailer 16 can substantially exceed twenty to thirty degrees.

As shown in FIGS. 8 and 9, trailer 16 includes a bolster plate 90 mounted on the underside of trailer frame 92, which contacts fifth wheel 82 of tractor 12 when kingpin 18 is pivotally engaged in slot 88 of the fifth wheel. Second embodiment sensor system 80 includes sensing means 94, such as a pair of proximity switches, with each one of the switches being mounted on respective ones of a pair of brackets 96. Each bracket 96 in turn is respectively mounted on a driver's side 98 and a curb side 100 of bolster plate 90. Activation means 102, such as a pair of magnets that corresponds to the pair of proximity switches 94, is respectively mounted on fifth wheel 82. More particularly, one of magnets 102 is mounted on driver's side 84 of fifth wheel 82 and the other magnet is mounted on curb side 86 of the fifth wheel, both via respective mounting brackets 104.

Activation of each proximity switch 94 is caused by close alignment of the switch with its corresponding magnet 102 at a predetermined point, as will be described below. For example, when vehicle 10 makes a forward left turn maneuver as shown in FIGS. 3 and 10, the rearward end of fifth wheel 82 of tractor 12 rotates toward the curb side of trailer 16. This rotation causes magnet 102 on curb side 86 of fifth wheel 82 to move into close alignment with curb side proximity switch 94, which is mounted on curb side 100 of bolster plate 90, thereby activating that proximity switch.

Conversely, when vehicle 10 makes a forward right turn maneuver, as shown in FIG. 11, the rearward end of fifth wheel 82 of tractor 12 rotates toward the driver's side of trailer 16. This rotation causes magnet 102 on driver's side 84 of fifth wheel 82 to move into close alignment with driver's side proximity switch 94, which is mounted on driver's side 98 of bolster plate 90, thereby activating that proximity switch.

The predetermined point at which each one of proximity switches 94 is in close alignment with its respective magnet 102 is dictated by the mounting location of the proximity switch on bolster plate 90, together with the mounting location of the magnet on fifth wheel 82. That is, the placement of proximity switch 94 on driver's side 98 of bolster plate 90 and the placement of its corresponding magnet 102 on driver's side 84 of fifth wheel 82 enable alignment of the proximity switch and its respective magnet when tractor 12 is at a specific angle, such as about thirty degrees, relative to the longitudinally-extending center line 106 (FIG. 3) of trailer 16. Of course, the placement of proximity switch 94 on curb side 100 of bolster plate 90 and the placement of its corresponding magnet 102 on curb side 86 of fifth wheel 82 mirrors that of the driver's side alignment described immediately above, thereby causing activation of proximity switches 94 at the same angle for a forward left or right turn, as well as a rearward left or right turn.

The placement of proximity switch 94 and corresponding magnet 102 depends on specific design and performance considerations. In some applications, proximity switch 94 and magnet 102 may be positioned so that they are aligned when tractor 12 is at an angle greater than about thirty degrees relative to center line 106 of trailer 16, such as at an angle of about forty, fifty, or even greater than fifty degrees. Moreover, the placement of proximity switch 94 also will be dictated by the size and rotational limits of fifth wheel 82, to ensure that the proximity switch will not be damaged by the fifth wheel as it rotates past the proximity switch in tight turning maneuvers, as well as when the fifth wheel rotates back as the maneuver is completed.

As shown in FIG. 8, proximity switches 94 each are independently electrically connected to automatic lift axle control system 68 (FIG. 7) via connection means 108. Connection means 108 preferably includes wires, coaxial cables, optical cables, and the like, which are well-known in the controller art. Control system 68 is the same as described above for first embodiment sensor system 30, and as noted, actuates the lift mechanism (not shown) to raise steerable axle 20. Thus, when proximity switch 94 is activated by a turning maneuver that causes a respective magnet 102 to align with the proximity switch, the switch senses the closely aligned magnet 102 and sends a signal to control system 68, which in turn actuates the lift mechanism, causing lifting of steerable axle 20.

As described above, control system 68 includes a lift axle control processor unit 72 that receives the activation signal from proximity switch 94 (FIGS. 9-10), indicating that vehicle 10 is executing a sharp turn and the control unit in turn sends a signal to the axle/suspension system lift mechanism (not shown) causing the lift mechanism to actuate. As with first embodiment sensor system 30, second embodiment sensor system 80 preferably uses the radio-frequency controller disclosed in U.S. Pat. No. 6,715,778. Of course, other control systems that are known in the art can be used, such as systems that are hard-wired.

After vehicle 10 completes the sharp turning maneuver, trailer 16 pivots relative to fifth wheel 82 of tractor 12 to a more longitudinally aligned position, thereby moving activating magnet 102 away from its close alignment with corresponding proximity switch 94. Control system 68 maintains axle/suspension system 32 in a lifted or raised position until a signal is sent to lower steerable axle 20. That is, lifted steerable axle 20 waits for a signal from processor unit 72 that causes the steerable axle to be lowered. Processor unit 72 sends the signal to lower steerable axle 20 when vehicle 10 has moved forward a predetermined distance as measured by a direction sensor 74 mounted proximate wheel 26 mounted on one of primary axles 24 (FIG. 7). When the predetermined distance is reached, sensor 74 sends a signal to control processor unit 72, which activates the lift axle mechanism causing lowering of axle/suspension system 32, in a manner well-known in the art.

It is to be understood that other means of sensing the completion of a drag turn maneuver, such as a certain time delay, may be used in addition to or in place of direction sensor 74, causing axle/suspension system 32 to lower, without affecting the overall concept of the present invention. Moreover, alternative mounting arrangements of proximity switch 94 and magnet 102 to accomplish automatic lifting of axle/suspension system 32 during a drag turn maneuver may be employed without affecting the overall concept of the invention.

Thus, second embodiment sensor system 80 of the present invention finds particular application when it is desired to maintain steerable lift axle 20 in a lowered position when the wheel-cut angle of the axle is at about twenty to thirty degrees, such as during over-the-road operation when a sharp turn is required, and to raise the axle at a more severe turn angle. In this manner, second embodiment sensor system 80 enables the lift mechanism to be actuated only when the most severe turn angles are required, thereby ensuring lifting in a parking lot or loading dock situation, rather than during navigation of certain public roads.

Both first and second embodiment sensor systems 30, 80, respectively, of the invention enable steerable lift axle 20 to perform according to new laws when vehicle 10 travels in forward and reverse, by automatically causing the axle to be lifted when tractor 12 makes a turn that results in a wheel-cut angle of the steerable lift axle which equals or exceeds about twenty to thirty degrees. This automation eliminates the inconvenience of the scenario where the driver exits cab 14 of tractor 12, lifts steerable axle 20 using a manual switch, re-enters the cab, completes the drag turn maneuver, exits the cab, lowers the axle using the manual switch, re-enters the cab and continues on his way. Also, in situations where the driver exiting cab 14 to lift steerable lift axle 20 is not practical, the invention reduces or eliminates severe tire scuffing.

The invention thus may lower costs attributed to maintenance, tire replacement and driver injury complaints. The invention finds application on a wide range of axle/suspension systems and vehicles using steerable lift axles. For example, the invention finds application as an option on existing vehicles 10 and existing axle/suspension systems 32, particularly on vehicles and systems affected by the new laws described above. The invention also finds application on new vehicles 10 and new axle/suspension systems 32, particularly on vehicles and systems that could be operated in countries with such laws. Moreover, the invention can be used to lift steerable axle 20 in situations other than tight turning maneuvers.

It is to be noted that certain components and arrangements of components have been described herein by way of example, but are not to limit the scope of the invention. For example, other types of sensing means 62, 94 known in the art may be used, such as optical sensors, limit switches and mechanical switches. Likewise, other types of activation means 66, 102 known in the art that serve to activate sensing means 62, 94 may be used, including reflectors, mating switch components, and even a structural component of vehicle 10. The positions of sensing means 62, 94 and activation means 66, 102 are also by way of example, as other locations may be used to accomplish actuation of steerable lift axle 20 at a predetermined wheel-cut angle. Moreover, the relative locations of sensing means 62, 94 and activation means 66, 102 as described above may be transposed, depending on the application.

Accordingly, the steerable axle lift sensor system of the present invention is simplified, provides an effective, safe, inexpensive, and efficient system which achieves all the enumerated objectives, provides for eliminating difficulties encountered with prior art steerable lift axle/suspension systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved steerable axle lift sensor system is constructed, arranged and used, the characteristics of the construction and arrangement, and the advantageous, new and useful results obtained; the new and useful structures, devices, elements, arrangements, parts and combinations, are set forth in the appended claims.

What is claimed is:

1. A sensor system for actuating the lifting of a steerable axle of a wheeled vehicle, said steerable axle having a central member and a spindle arm pivotally mounted on each one of a pair of ends of said central member, said sensor system comprising:
    a selected one of a sensing means and an activation means mounted on said central member; and
    the other one of said sensing means and said activation means mounted on said spindle arm, whereby when the spindle arm pivots to a predetermined position, the sensing means is activated by the activation means, and in turn actuates a lift mechanism for said steerable axle.

2. The sensor system for actuating the lifting of a steerable axle of a wheeled vehicle of claim 1, wherein said sensing means sends a signal to a control system to actuate said lift mechanism.

3. The sensor system for actuating the lifting of a steerable axle of a wheeled vehicle of claim 1, wherein said sensing means includes a proximity switch.

4. The sensor system for actuating the lifting of a steerable axle of a wheeled vehicle of claim 3, wherein said activation means includes a magnet.

5. The sensor system for actuating the lifting of a steerable axle of a wheeled vehicle of claim 1, wherein said predetermined position includes a wheel-cut angle of from about twenty to thirty degrees.

6. A sensor system for actuating the lifting of a steerable axle of a wheeled vehicle, said wheeled vehicle including first and second structures, at least one of said first and second structures being moveable relative to the other one of the first and second structures, said sensor system comprising:
    a proximity switch mounted on a selected one of said first and second structures; and
    a magnet mounted on the other one of said first and second structures, whereby when at least one of the first and second structures moves to a predetermined position relative to the other one of said first and second structures, said magnet activates said proximity switch to actuate a lift mechanism for said steerable axle.

7. A sensor system for actuating the lifting of a steerable axle of a wheeled vehicle, said wheeled vehicle including a central member of an axle and an axle spindle, at least one of said axle central member and said axle spindle being moveable relative to the other one of the axle central member and the axle spindle, said sensor system comprising:
    a proximity switch mounted on a selected one of said axle central member and said axle spindle; and
    a magnet mounted on the other one of said axle central member and said axle spindle, whereby when at least one of the axle central member and the axle spindle moves to a predetermined position relative to the other one of said axle central member and said axle spindle, said magnet activates said proximity switch to actuate a lift mechanism for said steerable axle.

8. A sensor system for actuating the lifting of a steerable axle of a wheeled vehicle, said wheeled vehicle including first and second structures, at least one of said first and second structures being moveable relative to the other one of the first and second structures, said sensor system comprising:
    sensing means mounted on a selected one of said first and second structures; and
    an activation means mounted on the other one of said first and second structures, whereby when at least one of the first and second structures moves about a vertically extending hinge to a predetermined position relative to the other one of said first and second structures, said activation means activates said sensing means to actuate a lift mechanism for said steerable axle.

9. The sensor system for actuating the lifting of a steerable axle of a wheeled vehicle of claim 8, wherein said sensing means includes a proximity switch.

10. The sensor system for actuating the lifting of a steerable axle of a wheeled vehicle of claim 9, wherein said activation means includes a magnet.

11. The sensor system for actuating the lifting of a steerable axle of a wheeled vehicle of claim 10, wherein said one of said first and second structures includes a central member of an axle and said other one of said first and second structures includes an axle spindle.

12. A sensor system for actuating the lifting of a steerable axle of a wheeled vehicle, said wheeled vehicle including first and second structures, at least one of said first and second structures being moveable relative to the other one of the first and second structures, said sensor system comprising:
    a proximity switch mounted on a selected one of said first and second structures, whereby when at least one of the first and second structures moves about a vertical pin to a predetermined position relative to the other one of said first and second structures, said proximity switch senses said position and actuates a lift mechanism for said steerable axle.

13. A sensor system for actuating the lifting of a steerable axle of a wheeled vehicle, said wheeled vehicle including first and second structures, at least one of said first and second structures being moveable relative to the other one of the first and second structures, said sensor system comprising:
    sensing means mounted on a selected one of said first and second structures; and an activation means is mounted on the other one of said first and second structures, whereby when at least one of the first and second structures moves about a vertical pin to a predetermined position relative to the other one of said first and second structures, said activation means activates said sensing means to actuate a lift mechanism for said steerable axle.

14. The sensor system for actuating the lifting of a steerable axle of a wheeled vehicle of claim 13, wherein said activation means includes a magnet.

* * * * *